June 17, 1930.    R. T. HOSKING    1,764,168
SELF LOCKING SCREW
Original Filed April 30, 1928

INVENTOR
RICHARD T. HOSKING
BY
ATTORNEY

Patented June 17, 1930

1,764,168

UNITED STATES PATENT OFFICE

RICHARD T. HOSKING, OF WILMETTE, ILLINOIS, ASSIGNOR, BY MESNE ASSIGNMENTS, TO SHAKEPROOF LOCK WASHER COMPANY, INCORPORATED, OF CHICAGO, ILLINOIS, A CORPORATION OF DELAWARE

SELF-LOCKING SCREW

Original application filed April 30, 1928, Serial No. 273,805. Divided and this application filed January 4, 1929. Serial No. 330,339.

This invention is a self-locking screw adapted to be received in the threaded opening in a piece of work so as to automatically engage the complementary threads so as to resist all ordinary forces tending to unscrew it. The amount of such resistance to unscrewing may be such that a screw can be removed without material damage either to itself or to the work, or if desired the ultimate resistance to unscrewing may be so great that the screw can not be taken out without spoiling it or mutilating the thread in the work.

Therefore, certain modifications are included in the scope of the invention as claimed herein.

The subject-matter disclosed herein has been divided out of my co-pending application, Serial No. 273,805, filed April 30, 1928, which describes and claims the broader aspects of a locking element comprising a spring tongue integral with the screw and adapted to clutch, bind or bite the thread of the work into which the screw is inserted. The basic and characteristic feature of the spring-like tongue resides in the fact that a biting edge of the tongue is projected outwardly beyond the wall of the imaginary cylinder that defines the periphery of the screw.

The present invention provides a novel mode of attaining the locking action of the spring tongue, namely, by twisting the tongue about its longitudinal axis.

Each of the two kinds of self-locking action above mentioned, moderate or positive, is attained by a modification in the shape and width of the twisted tongue.

To produce the less positive action the twisted tongue is made to present a segmentary cross sectional shape. The more positive locking action is attained by cutting away two sides of such a tongue, producing a smaller tongue of approximately equal breadth and thickness. Here the locking effect is produced by the tongue's tendency to roll and jam when it is attempted to turn the screw in the reverse direction.

With the foregoing and certain other objects in view, which will appear later in the specification, my invention comprises the devices described and claimed and the equivalents thereof.

Figure 1:
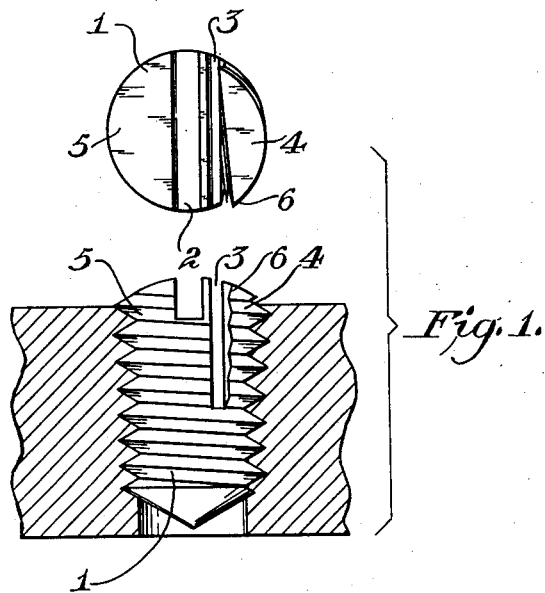

In the drawings Fig. 1 is a detail of the end and side of a left-hand screw embodying my invention.

Figure 2:
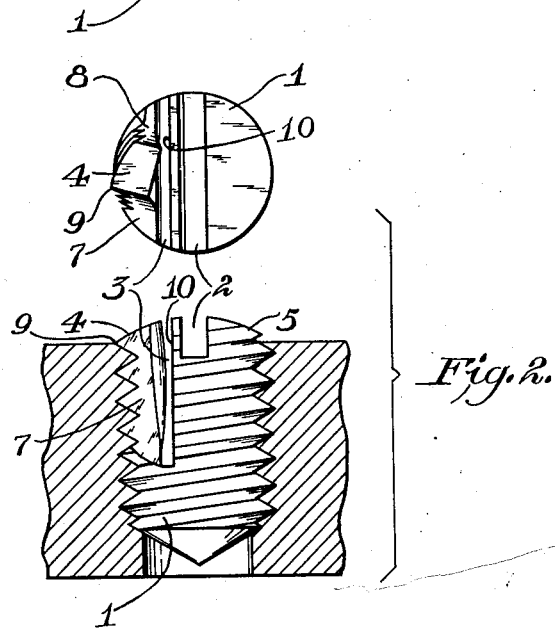

Fig. 2 is a similar view of a modified form for positive locking, showing the invention applied to a right-hand screw.

In Fig. 1 is illustrated an embodiment of the invention wherein a screw 1 is provided with the ordinary shallow screw-driver slot 2 across the middle of its end. At one end of this slot is a deep dividing slot 3 which separates the screw into two tongues or members 4, 5 that are not of the same size. The smaller of the two segment-shaped tongues is twisted about its own axis so as to project one of its corners 6 beyond the cylindrical periphery of the screw.

A screw made in accordance with Fig. 1 is inserted in the threaded hole of a piece of work causing the outwardly projecting toothed edge 6 to be sprung back toward its normal position, but the inherent spring tension, due to its having been axially twisted, imparts a persisting tendency to project the biting edge 6 outward, causing it to bind and scrape into the threaded hole of the work. Such biting action produces a locking effect adequate for some uses, although the screw can be removed with an ordinary screw-driver if sufficient force is exerted.

In the modified form of Fig. 2 the tongue is milled or cut away at two of its sides 7, 8, giving it approximately equal breadth and thickness. This tongue is twisted axially to project one of its outer threaded edges 9 beyond the normal circle of the screw.

At the commencement of the locking operation the ratchet-like or biting effect is the same as in the form shown in Fig. 1, but if the effort to turn the bolt backwardly persists then the spring tongue tends to roll or rotate about its longitudinal axis and the extremities of its diagonal dimensions become wedged between the wall of the work and the wall 10 of the complemental prong. In this situation the tongue has substantially the strut-like positive locking effect attained in the rolling tooth type of lock washer shown in my Patent No. 1,419,564.

For purposes of description I have illustrated and defined the invention as applied to a threaded screw although it will be understood to be also applicable to a bolt or threadless cylindrical bar. Such a bar, formed with the offset spring tongue herein described can be inserted in a cylindrical hole in a piece of work and can be freely rotated in one direction, but is retarded or locked with respect to rotation in the reverse direction. Thus the absence of bolt threads does not deprive the invention of its utility as a locking device to prevent backward rotation of a bolt.

Having thus described my invention, what I claim and desire to secure by Letters Patent is:

1. A bolt member adapted to be received in a complemental hole in a piece of work and formed with a slit located at one side of the axial line of the bolt and extending lengthwise from an end thereof and defining a spring tongue of relatively small cross sectional area, the free end of the tongue twisted axially to provide an offset portion which presents to the work a longitudinal edge that normally projects beyond the cylindrical periphery of the screw to engage the work in locking relation, for the purposes set forth.

2. A bolt member adapted to be received in a complemental hole in a piece of work and formed with a slit extending lengthwise from an end thereof and providing a spring tongue formed to substantially rectangular cross sectional shape, the tongue twisted axially to produce an offset portion whereby there is presented to the work a biting edge that normally projects beyond the cylindrical periphery of the bolt, to engage the work in locking relation by the strut-like action of its diagonal dimension, for the purposes set forth.

3. A threaded bolt member adapted to be received in a complemental hole in a piece of work and formed with a slit extending lengthwise from an end thereof and defining a spring tongue, the free end of the tongue warped, by axial twisting, out of concentricity with the body of the screw to present to the work a longitudinal biting edge that normally projects beyond the cylindrical periphery of the thread to engage the work in locking relation, for the purposes set forth.

4. In self-locking screws or bolts a bifurcated body at least one branch of which constitutes a resilient tongue displaced in a mode to present, outside the perimeter of the body, one of its edges as a biting edge, the sides of the tongue being cut away, making the width of the tongue substantially equal to its thickness, for the purposes set forth.

In testimony whereof, I affix my signature.

RICHARD T. HOSKING.